United States Patent [19]

Snow

[11] 4,062,185
[45] Dec. 13, 1977

[54] METHOD AND APPARATUS FOR WINDMILL STARTS IN GAS TURBINE ENGINES

[75] Inventor: Barton H. Snow, Wyoming, Ohio

[73] Assignee: General Electric Company, Cincinnati, Ohio

[21] Appl. No.: 686,013

[22] Filed: May 13, 1976

[51] Int. Cl.² ............................ F02K 3/06; F02K 3/12
[52] U.S. Cl. .................................... 60/204; 60/226 R; 60/39.14; 60/39.16 S; 60/39.18 C; 60/242
[58] Field of Search ................. 60/226 R, 226 A, 224, 60/269, 204, 223, 262, 39.14, 39.16 S, 39.16 C, 39.18 C, 242; 244/53 A

[56] References Cited

U.S. PATENT DOCUMENTS

| 2,952,973 | 9/1960 | Hall et al. ........................ 60/39.18 C |
| 3,488,947 | 1/1970 | Miller et al. ...................... 60/39.16 S |
| 3,940,926 | 3/1976 | Craig ...................................... 60/269 |

Primary Examiner—Carlton R. Croyle
Assistant Examiner—Robert E. Garrett
Attorney, Agent, or Firm—Dana F. Bigelow; Derek P. Lawrence

[57] ABSTRACT

A hydraulic pump and drive system is interconnected between the fan and compressor rotor of a turbofan engine such that the windmill speed of the core rotor can be boosted to a speed sufficient to allow a significantly increased in-flight start envelope by selectively extracting power from the windmilling fan prior to relight of the engine. Control logic is included to decouple the motor and pump whenever the engine is in the operating speed region and to selectively couple the fan-driven hydraulic pump to auxiliary machinery such as the nozzle actuators to obtain a dual-purpose function from the pump.

18 Claims, 5 Drawing Figures

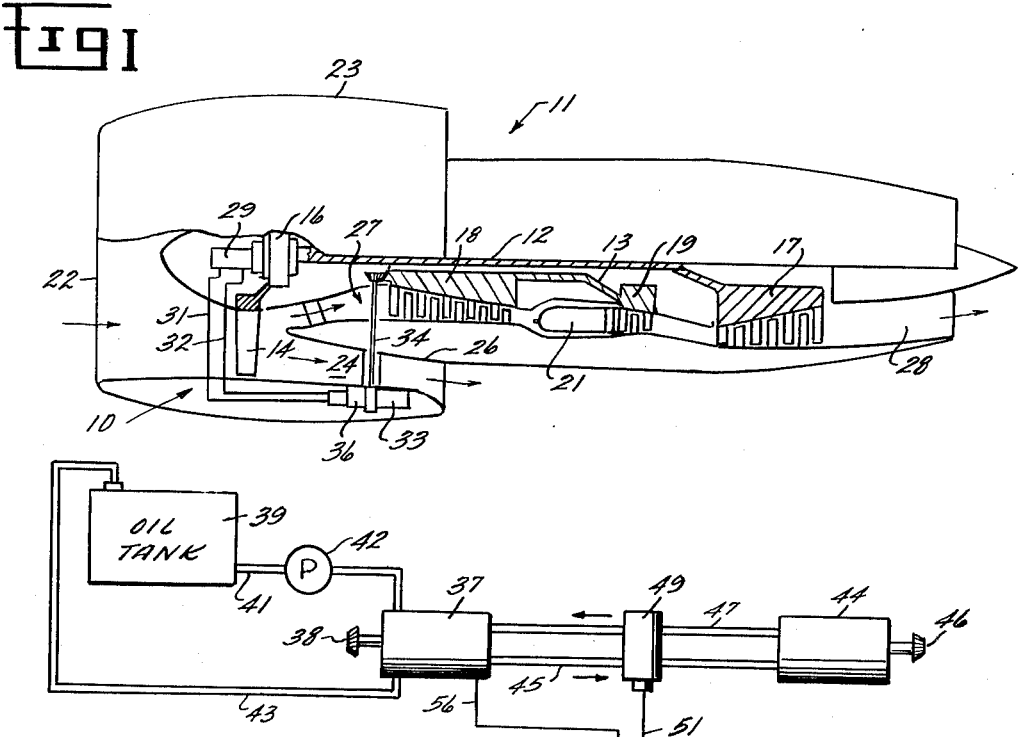
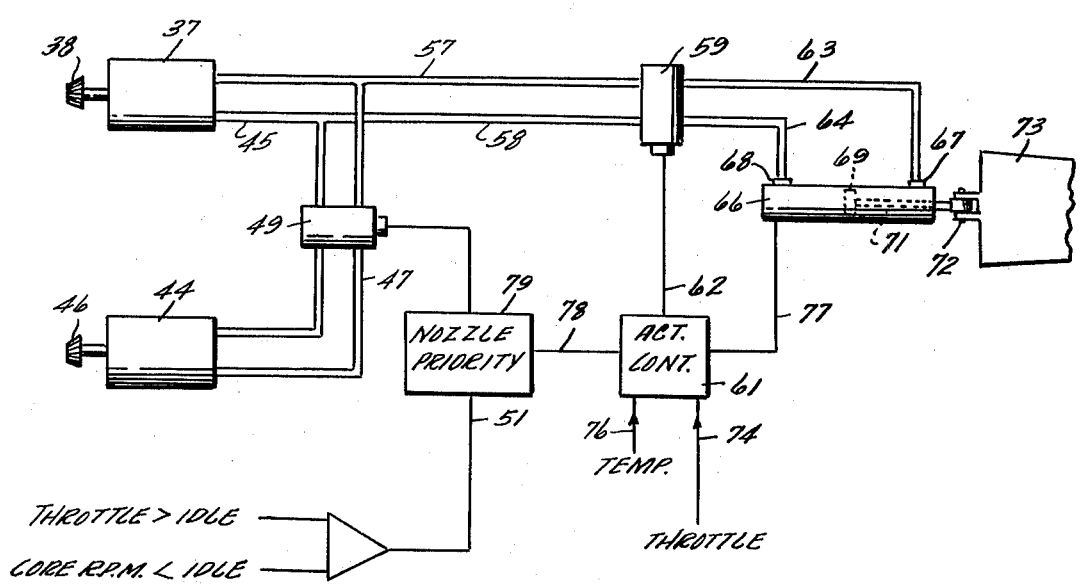

METHOD AND APPARATUS FOR WINDMILL STARTS IN GAS TURBINE ENGINES

BACKGROUND OF THE INVENTION

This invention relates generally to gas turbine engines and, more particularly, to start systems for gas turbines of the turbofan type.

The method by which gas turbine engines are started is by rotating the compressor up to a speed sufficient to provide air, under pressure, to support combustion in the combustion chamber. After the engine is fired, the starter must assist the engine until it has reached the self-accelerating speed, with the torque required being in excess of the torque required to overcome rotor inertia, engine accessory loads, the friction loads of the engine, and the extracted loads of aircraft accessories. Various power sources are used to start a gas turbine engine, among which are the use of electricity, gas, air, and hydraulic pressure. Whichever method is used, it must be capable of developing a very high power in a short time and transmitting it to the engine rotating assembly in a manner which provides a smooth acceleration from rest, up to a speed at which the gas flow provides sufficient power to the engine turbine to enable it to take over. This requirement is easily met by many different types of on-ground power supply systems or from power systems carried aboard the aircraft. If a flameout occurs to an engine during flight, the supply of thermal energy to the turbines will discontinue and the rotational speed of the compressor spool will accordingly decrease considerably; however, the engine will continue to rotate due to the flow of air through the compressor, a phenomenon which is commonly referred to as windmilling. In a turbojet engine, there is a large volume of air which passes through the compressor following a flameout, and the windmill speed of the core engine is sufficient for an in-flight start.

In the case of a turbofan engine, however, wherein a good portion of the air which enters the inlet of the engine passes around the engine core, the compressor rotor receives a smaller portion of the available ram energy and therefore does not attain as high a windmill speed as in the turbojet engine. This is particularly true of a mixed-flow type where a common nozzle allows only the duct pressure drop between the core inlet and core exit. If the windmill speed of the core is not sufficient, then an air-start cannot be obtained without some kind of starter assist. Since the ability of an engine to relight varies with altitude and forward speed of the aircraft, a starter assist may not be required over the entire flight envelope of an aircraft, but only a portion thereof, such as, for example, during low-speed flight.

One method by which a starter assist is provided for air starts is that of an auxiliary power unit (A.P.U.) wherein a gas turbine located aboard the aircraft provides shaft power to the core by way of a gearbox. After the engine is started and a predetermined engine speed is attained, a control valve is automatically closed and a clutch automatically disengages the drive mechanism. Another method employed is that of cartridge starting, wherein the starter motor is basically a small impulse-type turbine which is driven by high velocity gases from a burning cartridge. The power output of the turbine is passed through a reduction gear and an automatic disconnect mechanism to rotate the engine. Another method employed is that of the combustor air-starter wherein the starter unit has a small combustion chamber into which high pressure air from an aircraft mounted storage bottle along with atomized fuel are introduced and ignited to generate resultant gases which are directed onto the air-starter turbine.

Whatever method is used, auxiliary torque sources which need start-up or which can only be used once per flight are restrictive in their use.

It is therefore an object of the present invention to provide for a turbofan engine an improved starter-assist system which is always ready for quick and reliable application.

Another object of this invention is to provide a means by which a turbofan engine can be air started over a much larger portion of the flight envelope.

Still another object of this invention is the provision in a turbofan engine for an air-start assist system which can serve for more than the single purpose of starter assists.

Still another object of this invention is the provision in a turbofan engine for an air-start assist system which is relatively light in weight, effective in use, and simple in operation.

These objects and other features and advantages become more readily apparent upon reference to the following description when taken in conjunction with the appended drawings.

Summary of the Invention

Briefly, in one aspect of the invention, power is selectively derived from the rotation of the windmilling fan of an in-flight engine to be started. This power is then applied to rotate the compressor rotor of the engine to a speed sufficient to allow a relight of the engine. After the compressor reaches a predetermined speed, the drive system is automatically disconnected.

By another aspect of this invention, the power generated from the rotating fan can be applied to drive other auxiliary equipment aboard the aircraft during periods in which the air-start system is not in use. In this way, the system can be used for a dual purpose to thereby eliminate the weight of one of the systems which would otherwise have been required.

By yet another aspect of this invention, a hydraulic pump is driven by the windmilling fan of the turbofan engine, and the hydraulic fluid is selectively directed to a hydraulic motor to drive the compressor rotor. An electrohydraulic servovalve automatically disconnects the pump from the motor during periods in which the starter-assist system is not required. During those periods, the hydraulic pump can be selectively connected to operate an alternate motor to actuate auxiliary equipment such as exhaust nozzle actuators.

In the drawings as hereinafter described, a preferred embodiment and modified embodiments are depicted; however, various other modifications and alternate constructions can be made thereto without departing from the true spirit and scope of the invention.

BRIEF DESCRIPTION OF THE DRAWINGS

FIG. 1 is a schematic representation of a gas turbine engine in which the present invention is embodied;

FIG. 3 is a schematic representation of the hydraulic and control portion in accordance with one embodiment of the invention; and FIGS. 4 and 5 are modified embodiments thereof.

DESCRIPTION OF THE PREFERRED EMBODIMENT

Figure 5:
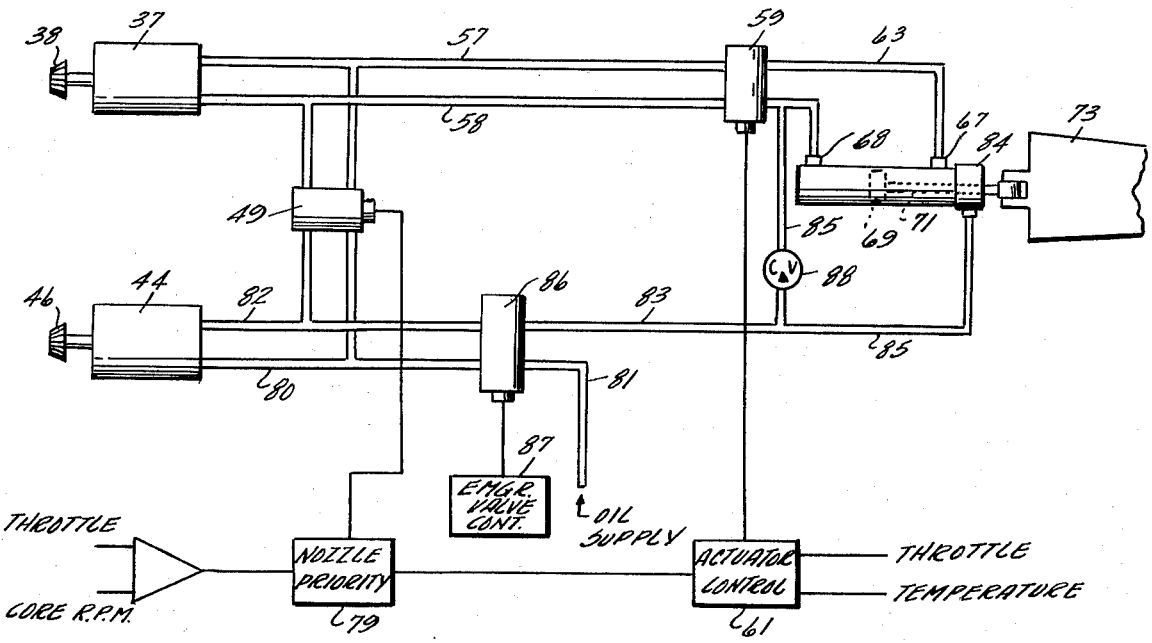

Referring now to FIG. 1, the present invention is shown generally at 10 as installed in a turbofan engine 11 having a fan rotor 12 and a core engine rotor 13. The fan rotor 12 includes a plurality of fan blades 14 mounted for rotation on a disc 16 and a low pressure or fan turbine 17 which drives the fan disc 16 in a well-known manner. Core engine rotor 13 includes a compressor 18 and a high pressure turbine 19 which drives the compressor 18. The core engine also includes a combustion system 21 which combines a fuel with the airflow and ignites the mixture to injet thermal energy into the system.

In operation, air enters the gas turbine engine 11 through an air inlet 22 provided by means of a suitable cowling or nacelle 23 which surrounds the fan rotor 12. Air entering the inlet 22 is compressed by means of the rotation of the fan blades 14 and thereafter is split between an annular passageway 24 defined by the nacelle 23 and an engine casing 26, and the core engine passageway 27 having its external boundary defined by the engine casing 26. The pressurized air which enters the core engine passageway 27 is further pressurized by means of compressor 18 and thereafter is ignited along with high energy fuel from the combustion system 21. This highly energized gas stream then flows through the high pressure turbine 19 to drive the compressor 18 and thereafter through the fan turbine 17 to drive the fan rotor disc 16. Gas is then passed out the main nozzle 28 to provide propulsion forces to the engine in a manner well known in the art. Additional propulsive force is obtained by the exhaust-pressurized air from the annular passageway 24.

It should be recognized that, although the turbofan 11 is depicted as having a short cowl or nacelle 23, it may very well have a long duct nacelle which extends aft to the main nozzle or it may be of the mixed-flow type wherein a mixer is provided to combine the gas stream flow from the fan duct annular passageway 24 and that from the core engine to exhaust from a single nozzle.

Assume now that the present turbofan engine, during in-flight operation, suffers a flameout, such as may occur by a malfunction by the fuel system or from a compressor stall condition wherein the air supply to the combustor is drastically disrupted. Since the flow of combustion gases to the turbines 19 and 17 will discontinue, the driving power to the compressor 18 and the fan rotor 12 will be removed and they will accordingly coast down in rotational speed. However, since the forward speed of the engine will cause the air to continue to flow through the passageways 24 and 27, both the fan rotor 12 and the core engine rotor 13 will continue to rotate because of the well-known windmill effect. The relative amount of air which flows into the passageways 24 and 27 will depend on their respective sizes, the ratio of which determines the bypass ratio of a turbofan engine. In most turbofan engines, however, the bypass ratio is greater than one, and therefore more air flows through the passageway 24 than through the passageway 27. During certain operational conditions, as for example at high speeds, the airflow through the compressor will be sufficient to windmill the compressor rotor to a speed which will allow a relight of the engine, but there will be other periods of operation during which this rotational windmill speed will not be sufficient to support the combustion for a relight. The present invention is designed for use during such periods and is also adapted for dual purpose during other periods of operation.

Figure 2:
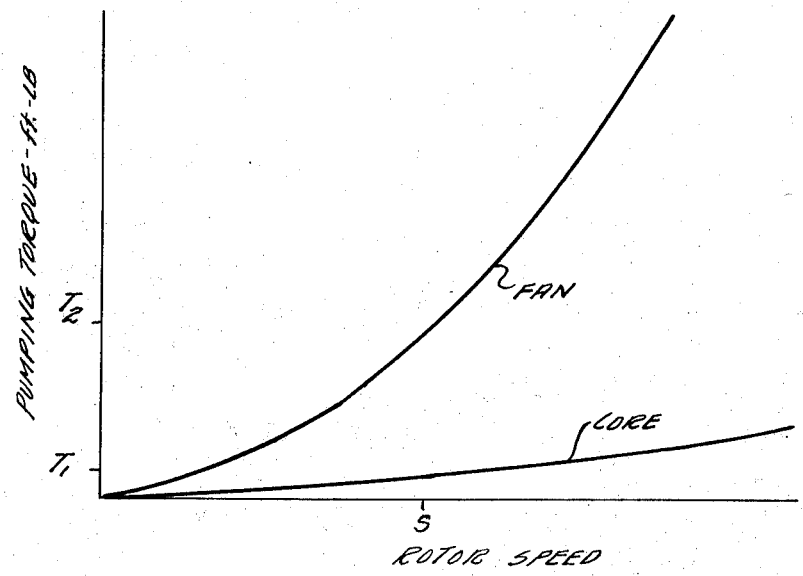
FIG. 2 is a graphic comparison, over a range of speeds, between the shaft power available from a windmilling fan with that of the core of a typical engine.

Whether dealing with a high bypass ratio or a low bypass ratio turbofan, it will be recognized that all of the air which enters the inlet 22 passes through the plane of the fan blades 14 to thereby impart a windmilling effect thereto, but only a portion thereof passes through the compressor 18. Accordingly, it is understandable that a great deal more energy is transmitted to the fan rotor 12 than to the core engine rotor 13 during windmilling conditions of operation. This can be easily seen by reference to FIG. 2 wherein, over a range of corrected fan speeds, the fan curve shows the amount of torque that is transmitted to the fan, and the core curve shows the amount of torque that is transmitted to the compressor during a windmilling condition. It can be seen that the windmilling energy developed by the fan is always greater than that developed by the core, with the difference being proportionately greater at higher speeds. Both curves are parabolic, but the slope of the fan curve increases much more rapidly because of the larger duct area.

For a typical turbofan engine, a rotor speed S and an associated torque $T_1$ is required to provide the necessary rotor speed to allow a relight. It will be seen that at this same speed the torque which is being developed by the windmilling fan is $T_2$ which is considerably greater than $T_1$. This torque $T_2$, is potentially available to use in boosting the core up to the necessary speed. At greater rotor speeds than S, there is more energy available from the fan and at lower speeds there is less energy; however, at all speeds there is power available to be transmitted from the fan rotor 12 to the core engine rotor 13. One method of transmitting this power between the rotors is shown schematically in FIG. 1. A power generator 29 such as a hydraulic pump or an electrical generator, is connected to and driven directly by the fan rotor 12. The generated power is then transmitted by lines 31 and 32 to a motor 33, which in turn is connected to the compressor 18 by way of an appropriate drive 34. An appropriate type of control unit 36 may be used to selectively apply or remove power from the motor 33 in response to certain operational parameters. For purposes of explanation, the present invention will be described in terms of a hydraulic system; however, it will be understood that other power generation and drive means could very well be substituted to accomplish the intended result.

Referring now to FIG. 3, a simplified hydraulic schematic system is shown to include a hydraulic pump 37 adapted to be mechanically attached to and driven by the fan rotor by way of a gear drive 38. Hydraulic fluid is applied to the pump 37 from an oil tank 39 along hydraulic line 41 which has a booster pump 42 attached thereto. A return line 43 is provided from the pump 37 to the oil tank 39 to complete the fluid supply system. The pump 37 discharges along line 45 to a hydraulic motor 44 having a drive gear 46 adapted to operatively engage the drive 34 to rotate the core compressor. The hydraulic fluid returns from the motor by way of the line 47. Since it is desirable that the motor 44 only deliver power to the compressor during periods in which a starter assist is required, an electrohydraulic solenoids valve 49 is interposed between the pump 37 and the motor 44 to provide a means of shutting down the hydraulic power to the motor 44 during those periods.

The solenoid valve 49 is controlled through lead 51 by way of a core control system 52 which operates in response to the core speed and throttle setting input along lines 53 and 54, respectively. More specifically, if the core speed is greater than a predetermined rotational speed (e.g., engine idle speed), then the control 52 will act to close the valve 49. Similarly, if a throttle is placed in an off position to indicate that the pilot does not desire that the engine be started, then the control 52 prevents the valve from opening. Another function which the control 52 may serve is to send a depressurizing signal along line 56 to the pump 37 to depressurize it during periods in which its power is not required to drive the motor 44, thereby reducing the heat load of the system.

In the modified embodiment of FIG. 4, the present system is shown to be adapted for a dual purpose use, one purpose being to provide a hydraulic core drive capability as described hereinabove and the other use being to provide the normal hydraulic power that is required to operate the jet nozzle hydraulic actuators. This is accomplished by the additional lines 57 and 58 fluidly communicating with the intake and discharge ports, respectively, of the hydraulic pump 37 at their one end and with an electrohydraulic servovalve 59 at the other ends. The servovalve 59 which receives control signals from the actuator control 61 along line 62, is a three-way valve which receives a unidirectional flow from line 58 and selectively discharges it to either line 63 or 64 to appropriately actuate the variable nozzle system. An actuator 66 is shown having a rod end port 67 and head end port 68, which hydraulically connect the lines 63 and 64 to opposite ends of the actuator cylinder. Slideably disposed in the actuator cylinder is a piston 69 and connecting rod 71, the rod 71 being connected at its other end by an appropriate fastener 72 to the flap 73 of the nozzle. Briefly, the actuator operates in such a manner that when the servovalve 59 causes a hydraulic fluid to flow into the head end port 68 by way of the line 64, the piston and attached rod are moved to the right and the flap 73 is opened. Conversely, when the hydraulic fluid is caused to flow into the rod end port 67, the rod 71 is retracted and the flap 73 is closed. Intermediate positions are appropriately obtained by modulation of the servovalve 59 by the actuator control 61.

It should be pointed out that although a single flap 73, a single actuator 66, and a single pump 37 are shown, in most system applications there will be a number of actuators 66 with each one most likely operating to move a number of associated flaps 73. Further, it should be readily apparent to those skilled in the art that the single hydraulic pump 37 may be utilized to position a number of actuators 66 by means of a suitable manifolding.

Returning now to the actuator control 61, its output to the electrohydraulic servovalve 59 to control the position of the variable nozzle is determined in part by a throttle setting input along line 74 and in part by a temperature input along line 76. More specifically, the servovalve 59 is controlled in response to the desired nozzle position (throttle) as compared with the actual nozzle position signal from line 77. Further, the signal received along line 76 acts to adjust the nozzle area as necessary to maintain system temperatures within certain prescribed limits. It is, of course, understood that other operational parameters may be applied to the actuator control in order to effect the desired engine performance characteristics as they are influenced by the exhaust nozzle area.

Consider now a situation wherein a flameout has occurred to the engine and the windmill speed to the core is not sufficient for a relight. Since the core rotational speed is less than that at idle, and since the throttle is placed in an "on" position, the servovalve 49 will turn on to direct the hydraulic fluid to the motor 44. However, at the same time, it may be that the nozzle area as determined by the position of the actuator 66 is not in conformance with that desired as indicated by the throttle signal along line 74. Since it is more important to first obtain the proper nozzle area setting rather than to commence windmill boost of the core engine, a nozzle priority function is introduced to decrease or shut down the supply of hydraulic fluid to the motor 44 until the nozzle actuator is in the desired position. In such a case, a signal is automatically received from the actuator control 61 along line 78 representing that the actual position does not conform with the desired nozzle area position. In response, a nozzle priority function 79 is introduced to modify the signal along line 51 so as to partially or wholly shut down servovalve 49. When the desired nozzle position is then obtained, the signal along line 78 decreases to zero and a servovalve 49 opens to provide full available hydraulic power to the motor 44. This will continue until the engine is started and the core speed reaches a level consistent with the idle speed at which time the signal along 51 will cause the servovalve 49 to close. The active hydraulic system will then include only the variable exhaust nozzle system which will operate in a normal manner until the starter assist system may again be needed.

It will be recognized that instead of the unidirectional pump 37 with associated downstream servovalve 59, a variable displacement, reversible flow piston pump may be used, in which case it would discharge into either of the lines 63 or 64 in response to a controlling servovalve. Since the pump output could be in either direction, some accommodation would have to be made to prevent the motor 44 from turning the core in the wrong direction. One way in which this could be accomplished is to provide for the discharge of the servovalve 49 to be in a single direction.

Assume now that an airplane is flying with the system of FIG. 4 wherein the hydraulic pump 37 is constantly operating to provide hydraulic fluid to operate the nozzle actuators, with the provision that an alternate use may be made thereof to power the motor 44 in the event that a flameout occurs. If, for some reason, the hydraulic system leading to the actuator should fail, as for example if the pump 37 or the servovalve 59 should fail, the piston 69 would tend to move to the right to thereby open the nozzle to its fullest extent. When this occurs, a great amount of engine thrust is lost and, if it happens to be a single engine airplane, the airplane cannot maintain altitude. FIG. 5 shows a modified system of that in FIG. 4 wherein to accommodate such a failure, hydraulic power is obtained from the core engine to move the actuators to a safe position. This is accomplished by temporarily substituting the entire system of FIG. 4 (except the motor 44) with an alternate oil supply, and using the motor 44 to pump hydraulic fluid to the actuator to move it to the safe position.

Referring now to FIG. 5, it can be seen that the input line 80 into the motor 44 is extended by a line 81 to an oil supply, and its output line 82 is extended by line 83 to a locking mechanism 84 and by a line 85 to the rod end 67 of the actuator 66. Each of these extension lines 81 and 83 are brought into the active hydraulic system by a servovalve 86 which is opened in response to an emergency valve control 87. The emergency valve control may be operated manually by the pilot or it may be automatically turned on in response to an operational parameter which may indicate the loss of normal hydraulic power. In any case, when the servovalve 86 is opened the rotating motor 44 would take suction along line 81 from the oil supply and discharge it along lines 82, 83, 85 and 63 to the actuator rod end 67, thereby forcing the piston to the left and the nozzle flaps to the closed position. A locking of the nozzle in that closed position will then be accomplished by an appropriate actuator locking mechanism 84 such as that shown and described in U.S. Pat. No. 3,314,335 issued to W. K. Gulick and assigned to the assignee of the present invention. The airplane can then continue to fly with the nozzle in its closed position until a landing can be made and an appropriate repair is effected. A check valve 88 is placed in the line 85 to prevent the flow of hydraulic fluid in that line during normal operation.

Having thus described the invention, what is considered novel and desired to be secured by Letters Patent of the United States is:

1. An improved air-start system for a turbofan engine of the type having compressor rotor and fan assemblies independently driven by separate turbine means wherein the improvement comprises first drive means selectively connectible between the fan and the compressor rotor such that during periods of in-flight windmilling the fan can be made to impart rotary motion to the compressor to accelerate it to a speed sufficient to accommodate an air start.

2. An improved air-start system as set forth in claim 1 wherein said first drive means comprises a hydraulic pump driven by the fan rotor and an associated hydraulic motor for imparting rotary motion to the compressor rotor.

3. An improved air-start system as set forth in claim 2 wherein said hydraulic pump is of the pressure compensated-type.

4. An improved air-start system as set forth in claim 1 and including a second drive means selectively connectible between the fan and an auxiliary equipment for the transfer of rotary motion therebetween.

5. An improved air-start system as set forth in claim 4 wherein said auxiliary equipment comprises actuators for variation of exhaust nozzle area.

6. An improved turbomachine of the type having first and second independently driven compressors rotatably mounted on an axis, with the first compressor adapted to discharge air to a combustor and the second compressor adapted to bypass at least a portion of its discharge flow around the first compressor, wherein the improvement comprises:
 a. power generation means for deriving energy from the second compressor during selective periods in which it is rotating; and
 b. motor means for selectively applying said derived energy to rotate said first compressor to a speed sufficient to allow a windmill start.

7. An improved turbomachine as set forth in claim 6 wherein said power generation means comprises a hydraulic pump and further wherein said motor means comprises a hydralic motor.

8. An improved turbomachine as set forth in claim 7 wherein said hydraulic pump is of the pressure-compensated type.

9. An improved turbomachine as set forth in claim 6 and including control means responsive to certain operational parameters to automatically apply said derived energy during the existence of predetermined conditions and discontinue application during nonexistence thereof.

10. An improved turbomachine as set forth in claim 9 wherein one of the operational parameters is engine throttle position.

11. An improved turbomachine as set forth in claim 9 wherein one of the operational parameters is the speed of the first compressor.

12. An improved turbomachine as set forth in claim 6 and including second drive means for applying said derived energy to additionally drive auxiliary equipment.

13. An improved turbomachine as set forth in claim 12 wherein said auxiliary equipment comprises actuators for variation of exhaust nozzle area.

14. An improved turbomachine as set forth in claim 13 and including a priority selection means adapted to give said auxiliary equipment priority over the first compressor in the application of the energy during predetermined conditions of operation.

15. An improved turbomachine as set forth in claim 6 and including second power generation means for selectively deriving energy from said first compressor during periods in which the engine is running to drive said auxiliary equipment.

16. An improved turbomachine as set forth in claim 15 wherein said second power generation means comprises a hydraulic pump.

17. An improved turbofan engine of the type having a compressor and a fan adapted to bypass a portion of the airflow around the compressor during engine operation and separate turbine means for drives of the compressor and fan, wherein the improvement comprises:
 a. power generation means connected to said fan to derive energy therefrom during selective periods in which it is rotated;
 b. motor means to be selectively driven by said derived energy during predetermined periods of operation; and
 c. drive means connecting said motor means to said compressor to rotate it to sufficient speed so as to allow a windmill start of the engine.

18. A method of starting a turbofan engine of the type having a compressor and a fan adapted to bypass a portion of the airflow around the compressor during engine operation and separate turbine means for driving the compressor and fan, comprising
 a. connecting a power generation means to said fan to derive energy therefrom during selective periods in which it is rotating;
 b. selectively connecting a motor means to said power generation means to derive energy therefrom during predetermined periods of operation; and
 c. connecting said motor means to said compressor to rotate it to a speed sufficient to allow a windmill start of the engine.

* * * * *